(12) United States Patent
Lu et al.

(10) Patent No.: US 10,095,321 B1
(45) Date of Patent: Oct. 9, 2018

(54) COMPUTER MOUSE CAPABLE OF RESTRAINING REBOUND FORCE

(71) Applicants: DEXIN ELECTRONIC LTD., Donggaun, Guangdong (CN); DEXIN CORPORATION, New Taipei (TW)

(72) Inventors: Ho-Lung Lu, New Taipei (TW); Yen-Yao Lai, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 15/637,196

(22) Filed: Jun. 29, 2017

(51) Int. Cl.
 *G06F 3/0354* (2013.01)

(52) U.S. Cl.
 CPC .................. *G06F 3/03543* (2013.01)

(58) Field of Classification Search
 CPC .................................................. G06F 3/03543
 USPC ............................................................ 345/163
 See application file for complete search history.

(56) References Cited

U.S. PATENT DOCUMENTS

| | | | | |
|---|---|---|---|---|
| 7,434,956 B2* | 10/2008 | Mattheis | ............. | F21V 23/0414 362/157 |
| 8,590,935 B1* | 11/2013 | Leedy | ................... | B60R 22/321 180/270 |
| 8,876,223 B2* | 11/2014 | Schiel | ..................... | B60T 7/042 188/152 |
| 2012/0080300 A1* | 4/2012 | Chen | ...................... | H01H 13/83 200/5 A |
| 2012/0314331 A1* | 12/2012 | Ahlert | ..................... | H01H 71/12 361/102 |
| 2013/0093606 A1* | 4/2013 | Chen | ...................... | H01H 13/83 341/22 |
| 2015/0029102 A1* | 1/2015 | Yang | .................. | G06F 3/03543 345/163 |

FOREIGN PATENT DOCUMENTS

| | | |
|---|---|---|
| TW | 201044223 A1 | 12/2010 |
| TW | M450770 U1 | 4/2013 |
| TW | M450771 U1 | 4/2013 |
| TW | I411941 B | 10/2013 |
| TW | I499942 B | 9/2015 |

* cited by examiner

*Primary Examiner* — Fred Tzeng
(74) *Attorney, Agent, or Firm* — Li & Cai Intellectual Property (USA) Office

(57) ABSTRACT

A computer mouse capable of restraining rebound force includes a main body, a circuit board, a switch module, a button and an elastic element. The circuit board and the switch module are assembled in a receiving space of the main body. The button is movably disposed on a top board of the main body in an up-and-down manner. The elastic element is disposed between the top board and the button and close to a free end of the button. The elastic element has a first end which is abutted against the top board of main body and a second end which is abutted against an inner side of the button. Thus, the elastic element can restrain the rebound force when the button is pressed, and the button can be clicked exactly without generating a double-click event.

10 Claims, 10 Drawing Sheets

COMPUTER MOUSE CAPABLE OF RESTRAINING REBOUND FORCE

BACKGROUND OF THE INVENTION

1. Field of the Invention

The present invention is related to a computer mouse having a button. In particular, the present disclosure relates to a computer mouse having a button and being capable of restraining rebound force.

2. Description of Related Art

Keyboards and computer mice are the most commonly-used input devices for computers. A conventional computer mouse usually has a left button, a right button, and a scroll wheel between the left and right buttons. The buttons are movably disposed on a main body of the computer mouse in an up-and-down manner. A triggering portion is disposed on an inner side of the button and arranged above a micro-switch. When the button is pressed, the micro-switch can be activated by the triggering portion.

With the increasing popularity of video games, game fans share experiences and exchange game tips through livestreams, which draws public attention. Players who possess superb gameplay mechanics or strategy often choose a career in video games, i.e. competitive players. Over the years, video games have evolved toward competitive play, and a mouse is often clicked hundreds of times throughout the span of just one game. However, after a button of the computer mouse is pressed, a rebound force is produced on the button because the button has a longer arm of force, so that the button cannot be clicked exactly and would generate a double-click event.

The abovementioned drawbacks of the conventional computer mouse seem to leave room for improvement in the art.

SUMMARY OF THE INVENTION

One objective of the present disclosure is to provide a computer mouse, and the buttons can be exactly clicked without generating a double-clicking event.

In order to achieve the above objective, the present disclosure is to provide a computer mouse having a button and being capable of restraining rebound force, which includes a main body, a circuit board, a switch module, a button and an elastic element. The main body has a top board. The top board is arranged on a top of the main body, and a receiving space is formed in the main body. The circuit board is assembled in the receiving space. The switch module is mounted in the receiving space and electrically connected to the circuit board. The button is movably disposed on the top board of the main body in an up-and-down manner. The button has a triggering portion formed on an inner side thereof, the triggering portion is arranged on the switch module, and the button has a free end. The elastic element is disposed between the top board of the main body and the button. The elastic element is close to the free end of the button, and has a first end and a second end. The first end of the elastic element is abutted against the top board of the main body and the second end of the elastic element is abutted against the inner side of the button, so as to restrain a rebound force from the button.

Thus, the present disclosure has advantages as follows. The present disclosure provides an elastic element between the top board of the main body and the button. The elastic element is close to the free end of the button. The elastic element has a first end and a second end. The first end of the elastic element is abutted against the top board of the main body, and the second end of the elastic element is abutted against the inner side of the button. When a user presses the button, the elastic element can be used to restrain a rebound force from the button, so that the button can be exactly clicked without generating a double-click event.

In addition, the elastic element is disposed between the top board of the main body and the button. The arrangement of the elastic element does not occupy other spaces, and the top board of the main body is a fixed element. The first end of the elastic element is abutted against the top board of the main body, such that the entire structure is more stable in operation, and the second end of the elastic element can be exactly contacted with the inner side of the button.

Moreover, the elastic element is received in the accommodating slot on the top board of the main body, so that the elastic element can be stably disposed on the top board of the main body.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE EXEMPLARY EMBODIMENTS

First Embodiment

Figure 1:
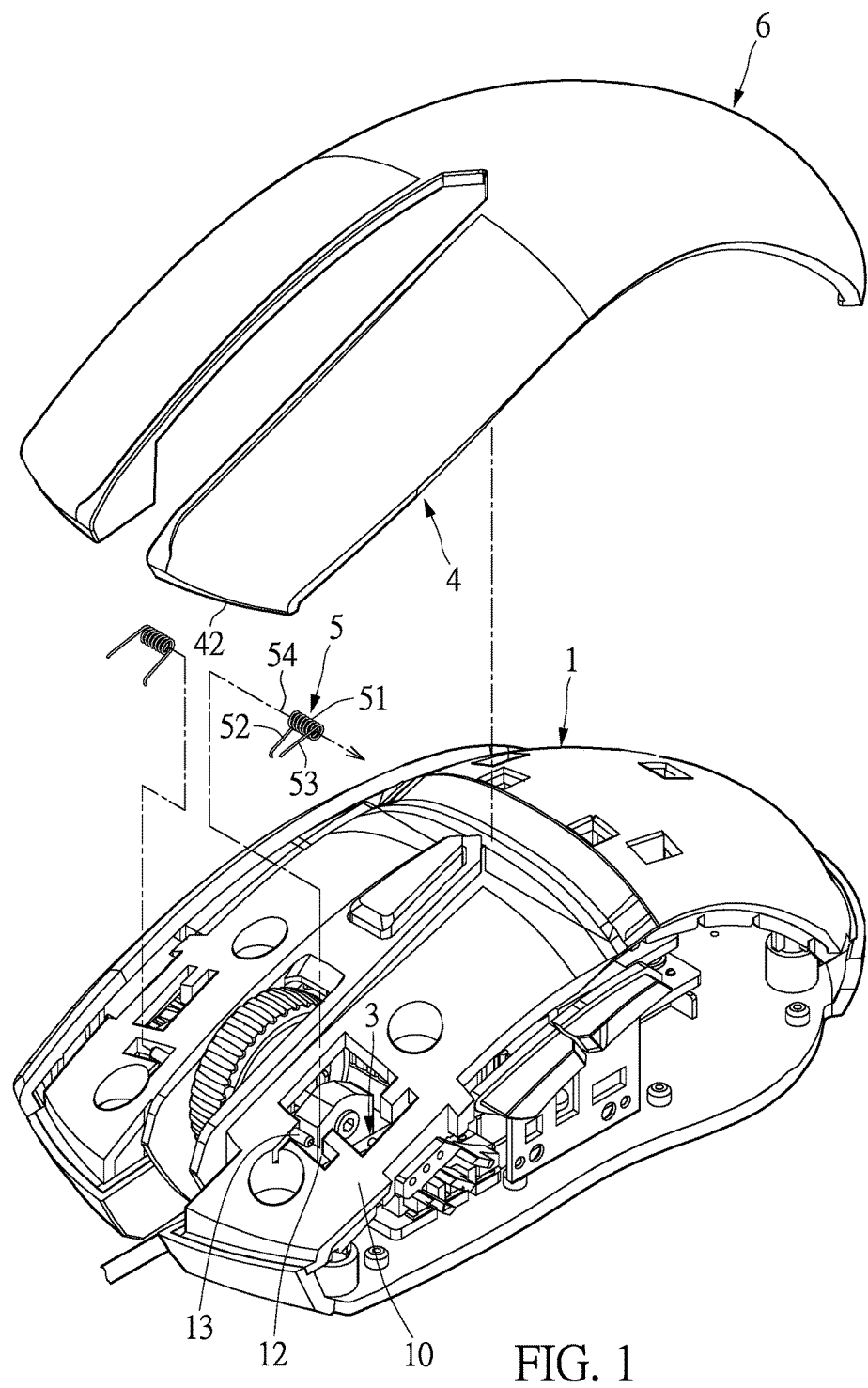
FIG. 1 is an exploded perspective view of a computer mouse according to a first embodiment of the present disclosure.
Figure 2:
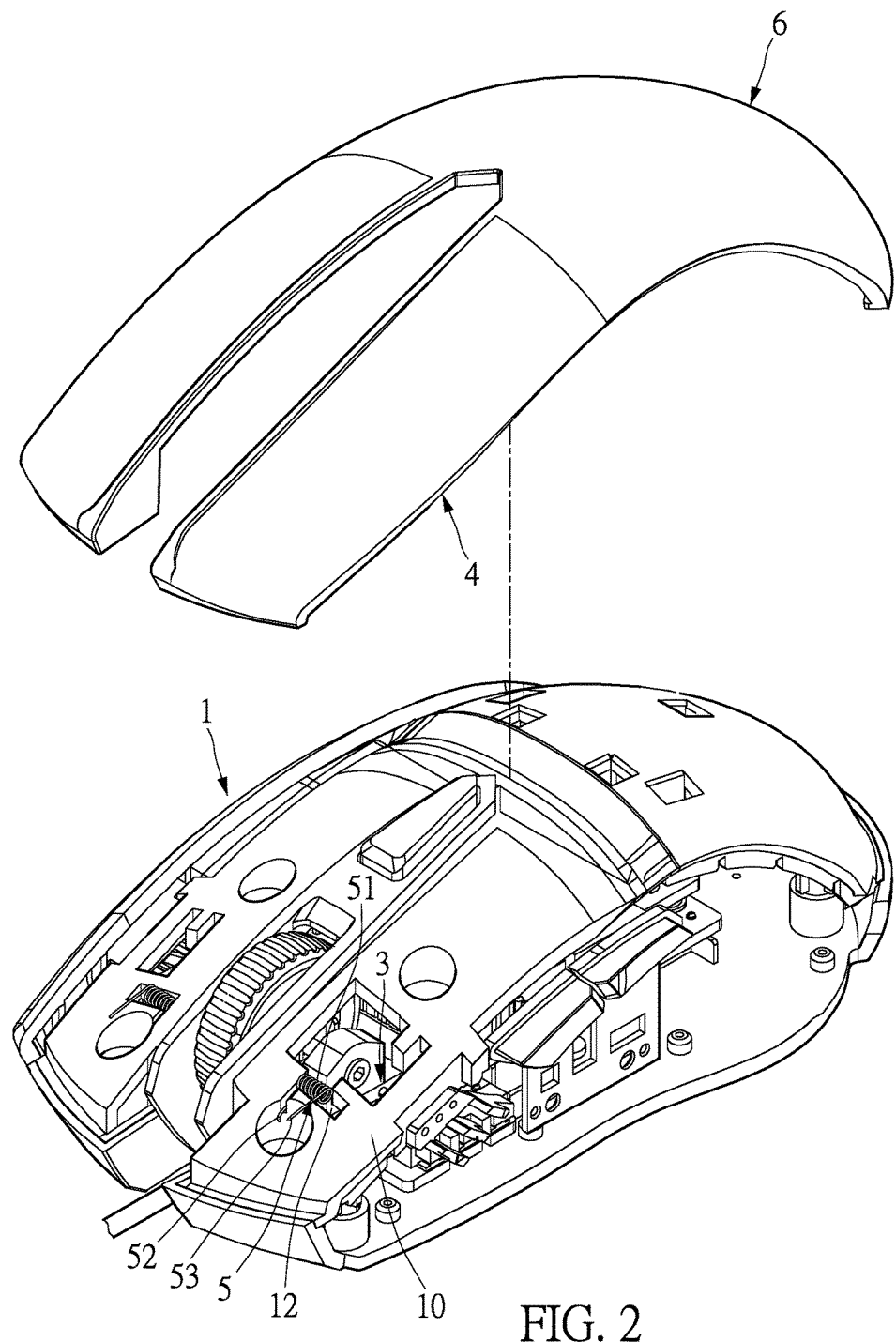
FIG. 2 is another exploded perspective view of the computer mouse according to the first embodiment of the present disclosure.
Figure 3:
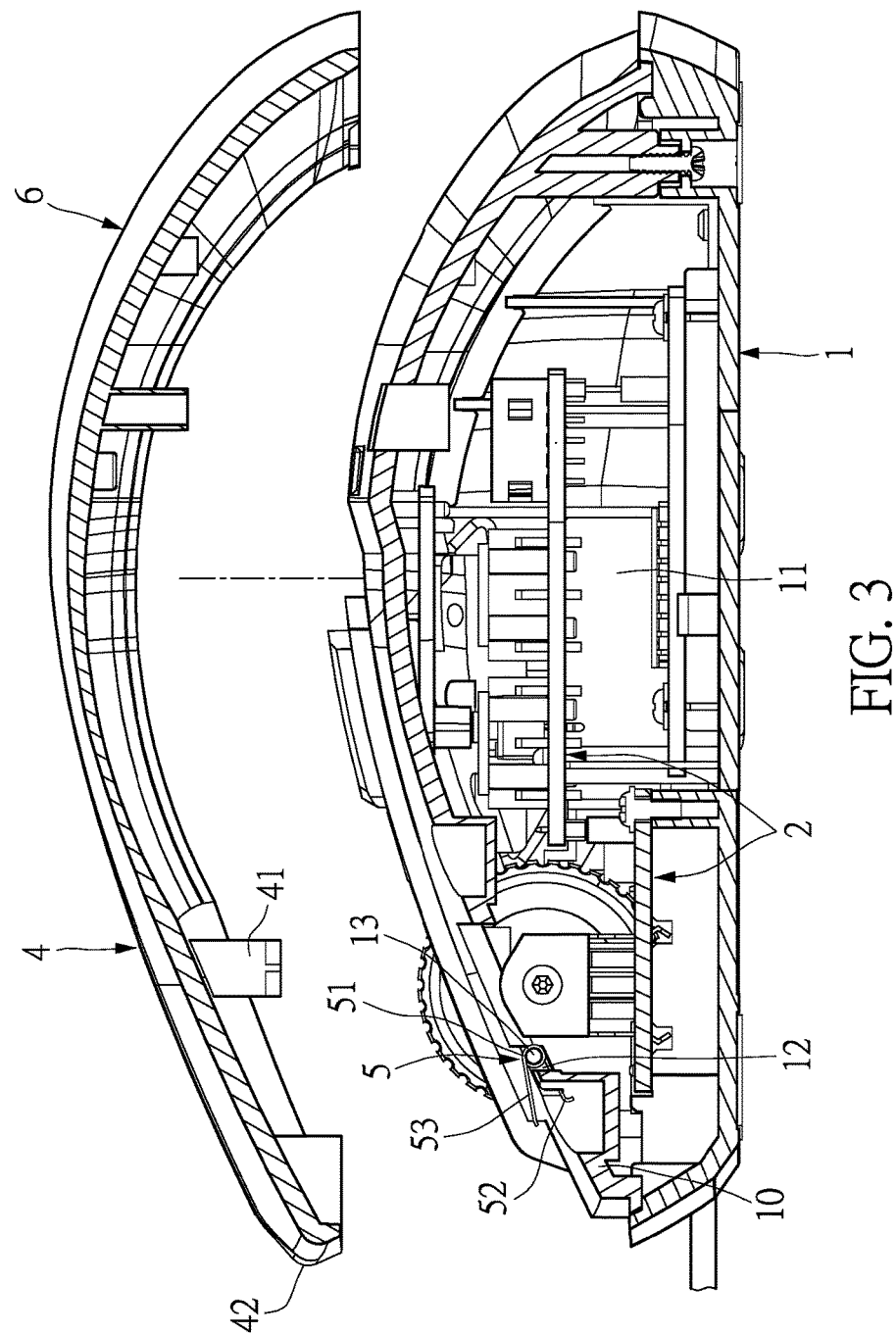
FIG. 3 is a cross-sectional view of the computer mouse according to the first embodiment of the present disclosure.
Figure 4:
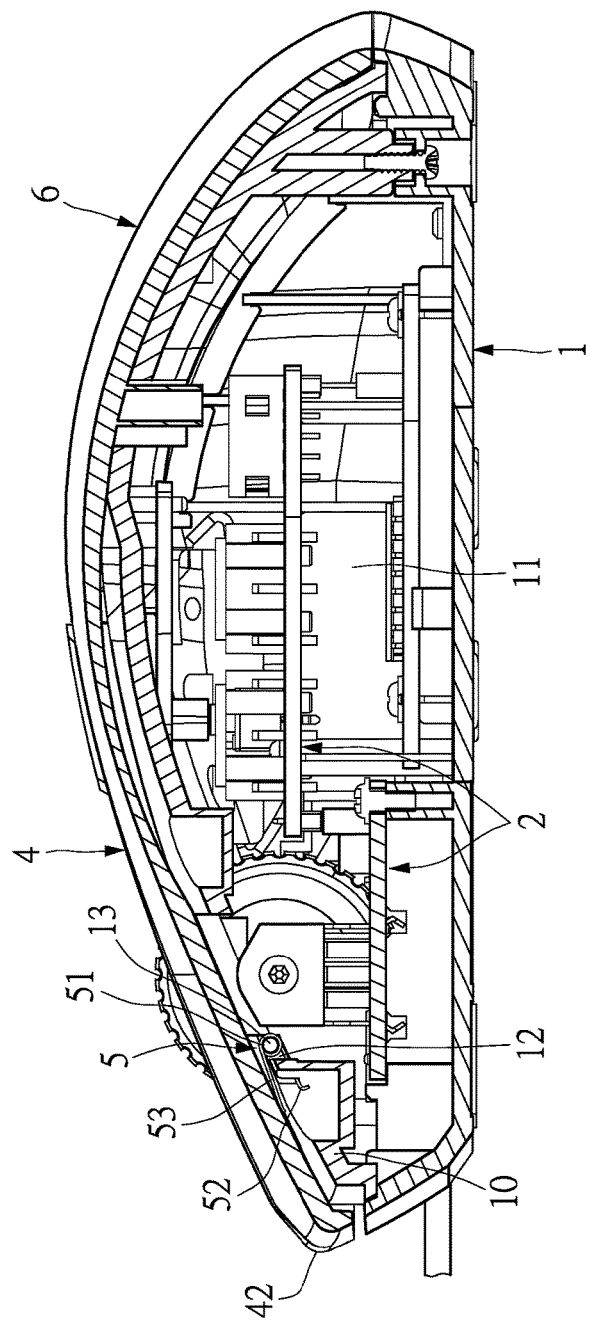
FIG. 4 is another cross-sectional view of the computer mouse according to the first embodiment of the present disclosure.
Figure 5:
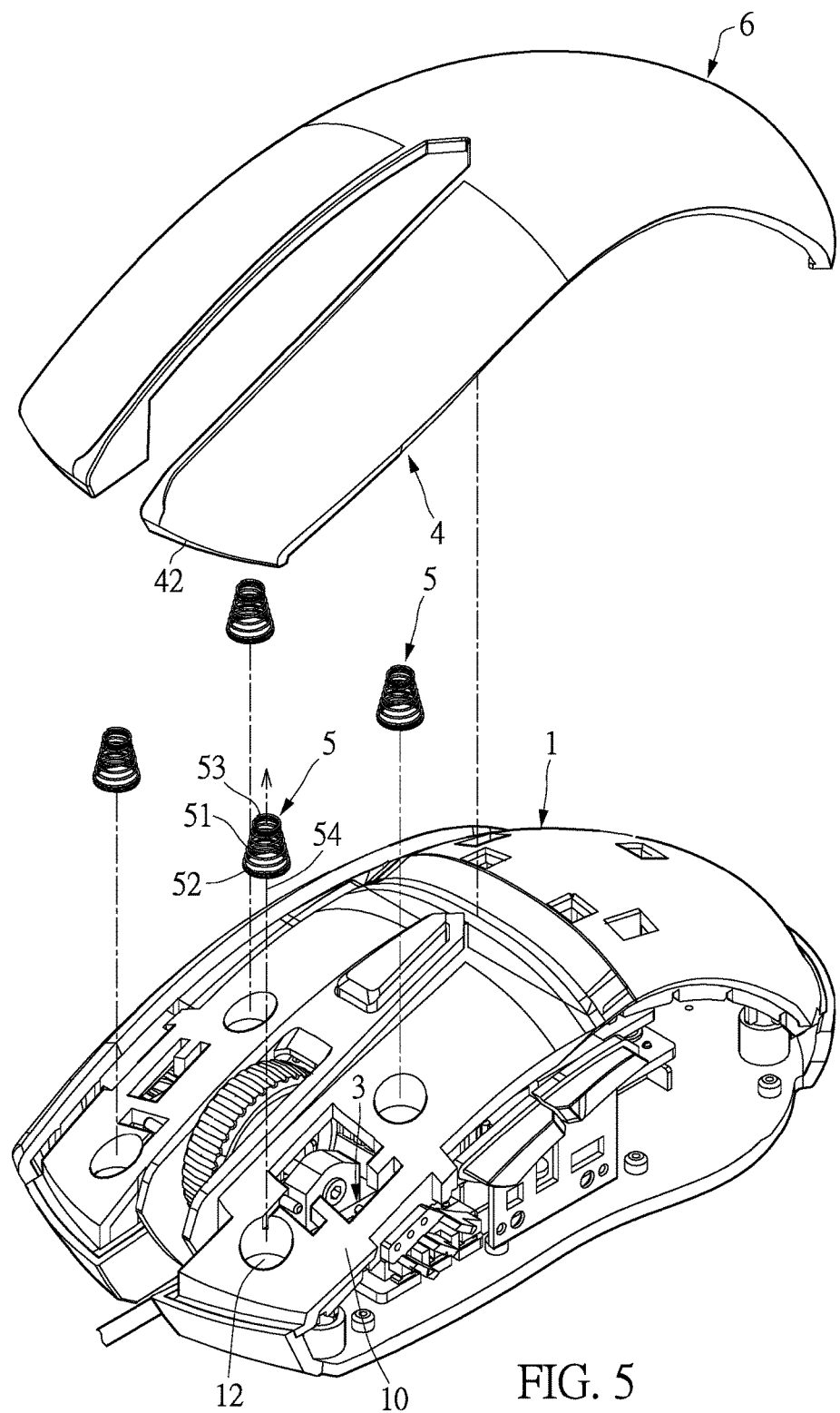
FIG. 5 is an exploded perspective view of a computer mouse according to a second embodiment of the present disclosure.
Figure 6:
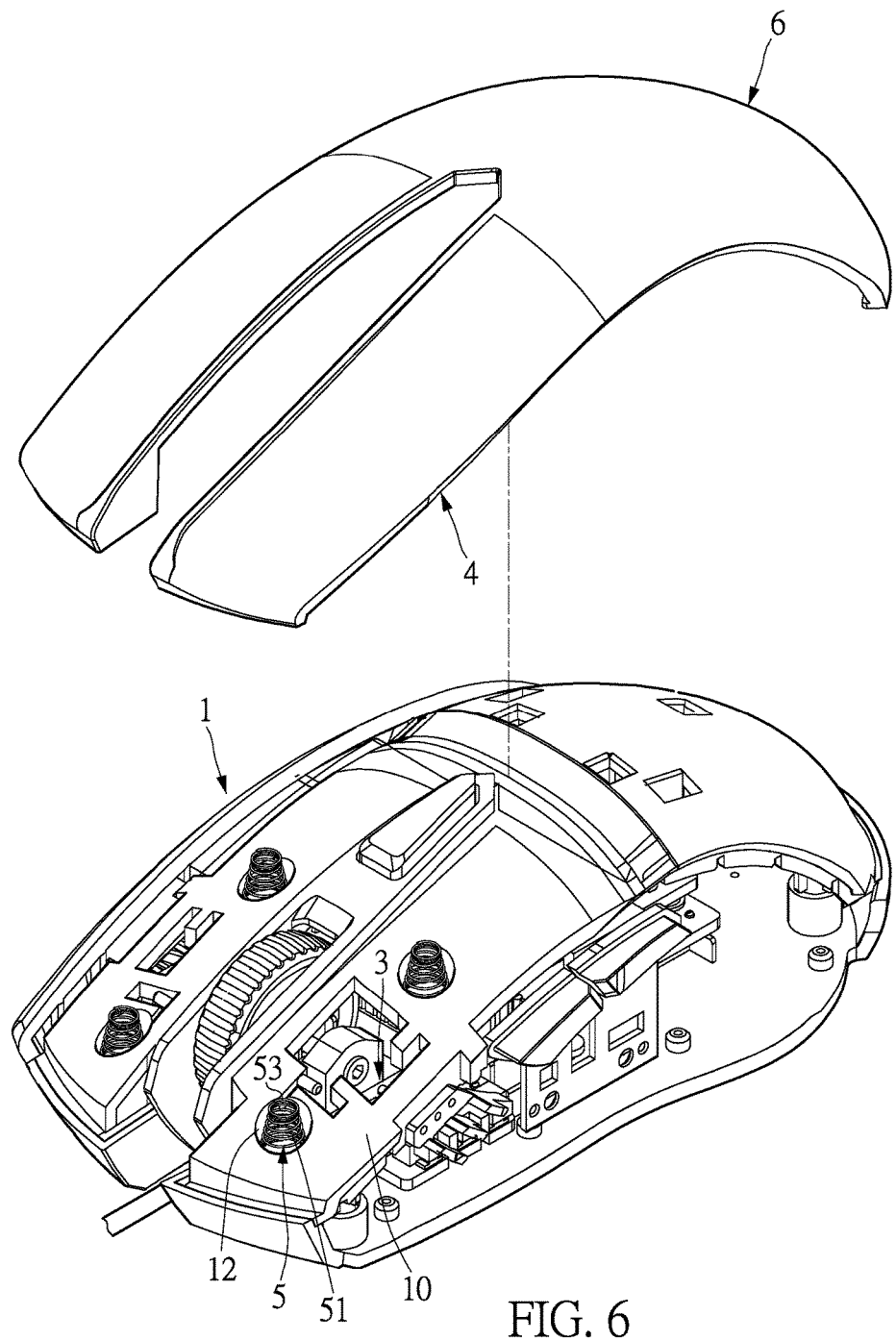
FIG. 6 is another exploded perspective view of a computer mouse according to the second embodiment of the present disclosure.
Figure 7:
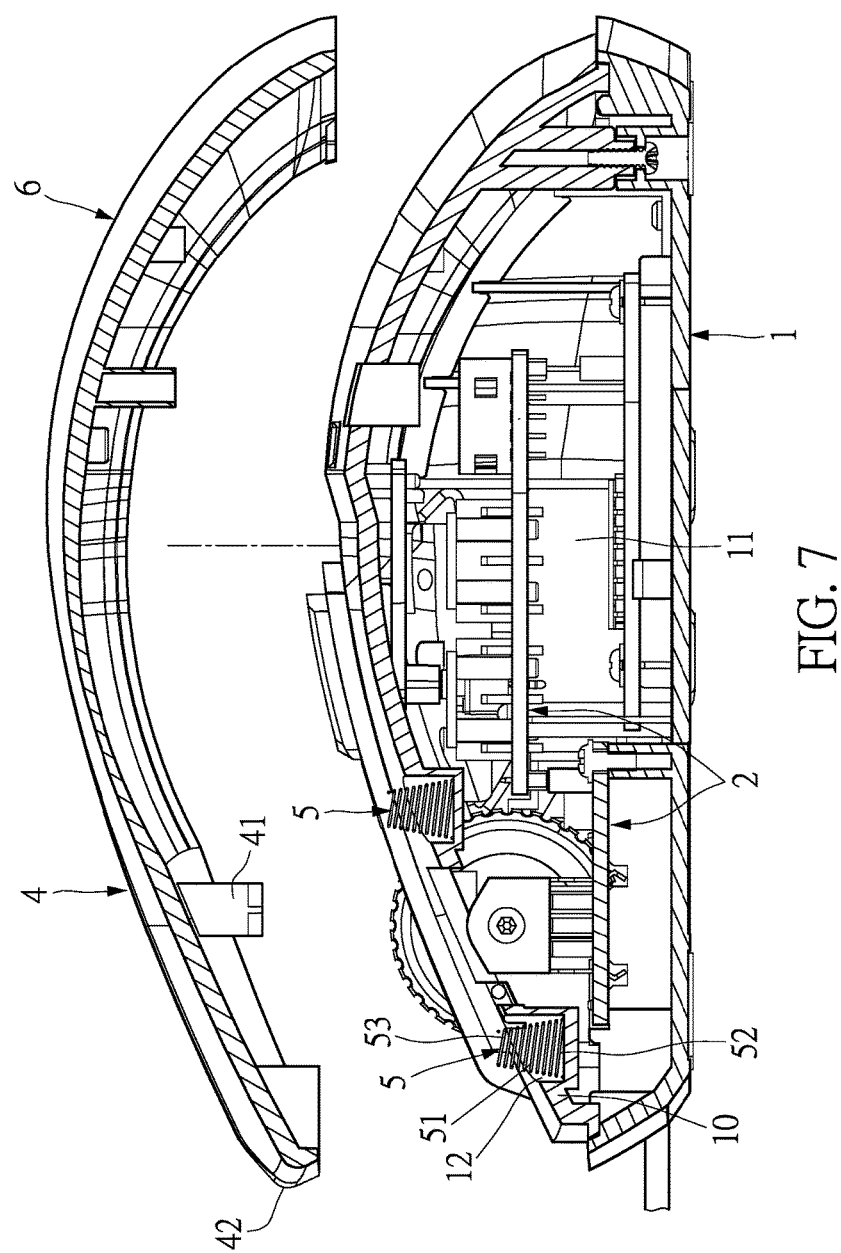
FIG. 7 is a cross-sectional view of the computer mouse according to the second embodiment of the present disclosure.
Figure 8:
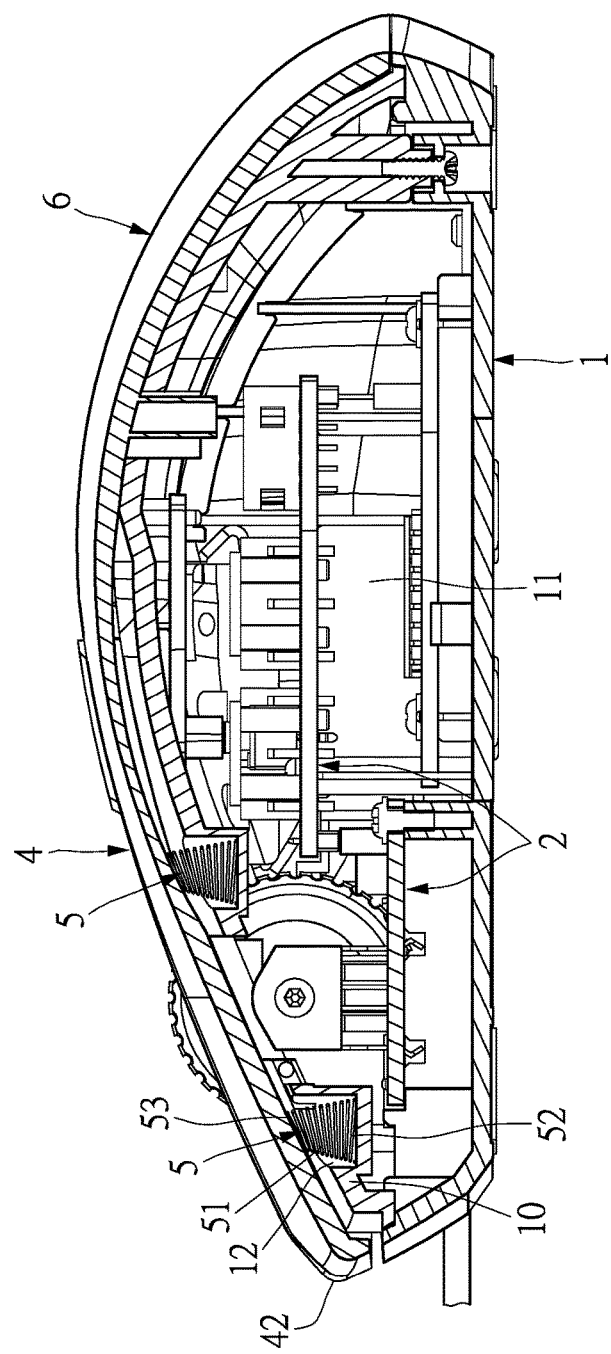
FIG. 8 is another cross-sectional view of the computer mouse according to the second embodiment of the present disclosure.

Reference is made to FIG. 1 to FIG. 4. The present disclosure provides a computer mouse having a button and being capable of restraining rebound force, which includes a main body 1, a circuit board 2, a switch module 3, a button 4 and an elastic element 5.

The main body 1 has a top board 10, and the top board 10 is disposed on a top of the main body 1. The main body 1 is disposed with a receiving space 11 therein. The circuit board 2 and the switch module 3 are installed in the receiving space 11. The switch module 3 is disposed on the circuit board 2. The switch module 3 is electrically connected to the circuit board 2. The receiving space 11 is an inner space of the main body 1, which is equipped with necessary elements such as an optical reading module and a roller and so on for operating a computer mouse. These elements are not described here.

The button 4 is a long-shaped board and is movably disposed on the top board 10 of the main body 1 in an up-and-down manner. The button 4 has a triggering portion 41 formed on an inner side thereof. The triggering portion 41 is disposed above the switch module 3. In this embodiment, an upper cover 6 is integrally connected on a rear end of the button 4. The upper cover 6 is assembled fixedly on the top board 10 of the main body 1. The upper cover 6 can be fixed on the top board 10 of the main body 1 by wedging, screwing or attaching and so on, but the connection method is not limited thereto.

The button 4 has a front end which is a free end 42, and a rear end which is arranged as a fulcrum, so that the button 4 is movable in an up-and-down manner. When the button 4 is pressed, the switch module 3 is activated by the triggering portion 41. The computer mouse has two buttons 4 respectively disposed at left and right sides, and two switch modules 3 correspondingly disposed thereunder. Since the two buttons 4 are similar and the two switch modules 3 are also similar, only one button 4 and one switch module 3 are illustrated, and the number thereof is not limited thereto.

The elastic element 5 can be a compression spring, a torsion spring or a blade spring . . . etc. However, the elastic element 5 is not limited thereto. Each button 4 is correspondingly assembled with at least one elastic element 5, that is, each button 4 can be assembled with one or more elastic elements 5. In this embodiment, the elastic element 5 is a torsion spring, and each button 4 is correspondingly assembled with one elastic element 5. The elastic element 5 is disposed between the top board 10 of the main body 1 and the button 4. The elastic element 5 can be abutted against an inner side of the button 4, so as to provide the button 4 with a recovery force of moving upwards.

In this embodiment, the elastic element 5 is a torsion spring, and has a main part 51. The main part 51 can be a cylindrical spiral. The elastic element 5 has a first end 52 and a second end 53. The first end 52 and the second end 53 are formed at two ends of the main part 51. The main part 51 of the elastic element 5 can be received in an accommodating slot 12 of the top board 10 of the main body 1, so that the elastic element 5 can be stably disposed on the top board 10 of the main body 1. The accommodating slot 12 can be a square recess, but the shape of the accommodating slot 12 is not limited thereto.

The accommodating slot 12 can further has a cylindrical rod 13, and the main part 51 of the elastic element 5 can be sleeved on the cylindrical rod 13, so that the elastic element 5 can be more stably disposed on the main body 1. The first end 52 of the elastic element 5 is abutted against the main body 1, that is, the first end 52 of the elastic element 5 can be abutted against the top board 10 of the main body 1. The second end 53 of the elastic element 5 is abutted against an inner side (or bottom surface) of the button 4, so that the elastic element 5 can provide the button 4 with a reacting force when the button 4 is pressed.

The elastic element 5 is close to a free end 42 of the button 4, that is, a front end of the button 4, so that the second end 53 of the elastic element 5 contacts a position of the button 4 which is far away from the other end (or the rear end) of the button 4. Thus, the elastic element 5 can provide better upwards pushing effect.

In a preferred embodiment, the main part 51 of the elastic element 5 is disposed horizontally on the main body 1, or in a traverse direction. In other words, an axial direction 54 of the main part 51 of the elastic element 5 is arranged in a horizontal manner. The second end 53 of the elastic element 5 can be extended along a longitudinal direction (or from the front to the rear) of the button 4. In other words, an extension direction of the second end 53 of the elastic element 5 can be perpendicular to the axial direction 54 of the main part 51, so that the second end 53 of the elastic element 5 can provide a stronger force to the button 4. When a user presses the button 4, the elastic element 5 can be used to restrain a rebound force from the button 4, and the button 4 can be exactly clicked without generating a double-click event.

In addition, according to the present disclosure, the elastic element 5 is disposed between the top board 10 of the main body 1 and the button 4. The arrangement of the elastic element 5 does not occupy other spaces. The top board 10 of the main body 1 is a fixed element, and the first end 52 of the elastic element 5 is abutted against the top board 10 of the main body 1. Thus, the entire structure is more stable in operation, and the second end 53 of the elastic element 5 can be exactly contacted with the inner side of the button 4. And then, the elastic element 5 can practically restrain a rebound force from the button 4.

Second Embodiment

Reference is made to FIG. 5 to FIG. 8. The main difference between this embodiment and the above embodiment is that, the elastic elements 5 of this embodiment are compression springs. Each elastic element 5 has a main part 51 which can be a spiral structure. The elastic element 5 has a first end 52 and a second end 53. The first end 52 and the second end 53 are respectively formed at two ends of the main part 51. The first end 52 and the second end 53 are ring-shaped. A diameter of the first end 52 is larger than that of the second end 53, so that the main part 51 is a tapered screw. Each button 4 can be equipped with two elastic elements 5, and the two elastic elements 5 are respectively disposed at a front position of the switch module 3 and a rear position of the switch module 3. The elastic element 5 is disposed between the top board 10 of the main body 1 and the button 4. At least one elastic element 5 is close to the free end 42 of the button 4, and the elastic element 5 contacts the inner side of the button 4, so as to provide the button 4 with a recovery force of moving upwards.

In this embodiment, the elastic elements 5 are respectively received in the accommodating slots 12 on the top board 10 of the main body 1. The accommodating slot 12 can be a circular hole. The main part 51 of the elastic element 5 is vertically disposed on the main body 1, that is, an axial direction 54 of the main part 51 of the elastic element 5 is vertical. The first end 52 of the elastic element 5 contacts the top board 10 of the main body 1 (the bottom of the accommodating slot 12). The second end 53 of the elastic element 5 contacts the inner side of the button 4. When a user presses the button 4, the elastic element 5 can restrain a rebound force from the button 4, and the button 4 can be clicked exactly without generating a double-click event.

Third Embodiment

Figure 9:
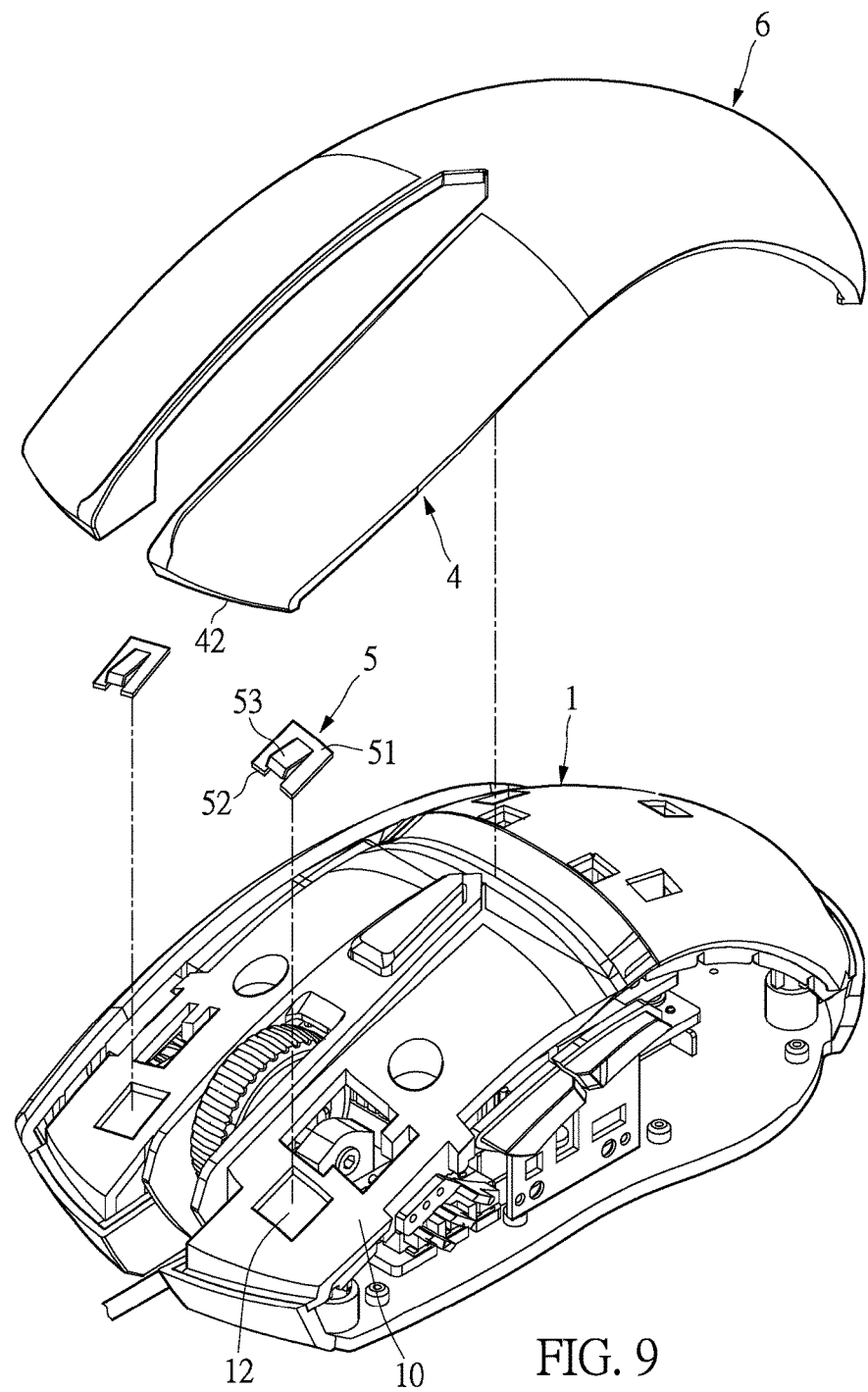
FIG. 9 is an exploded perspective view of a computer mouse according to a third embodiment of the present disclosure.

Reference is made to FIG. 9. The main difference between this embodiment and the above embodiment is that, the elastic elements 5 of this embodiment are blade springs. Each elastic element 5 has a main part 51, and the main part 51 can be in a blade shape. The elastic element 5 has a first end 52 and a second end 53. The first end 52 and the second end 53 are formed on the main part 51. Each button 4 is correspondingly equipped with an elastic element 5. The elastic element 5 is close to the free end 42 of the button 4. The elastic element 5 is disposed between the top board 10 of the main body 1 and the button 4. The elastic element 5 contacts the inner side of the button 4, so as to provide the button 4 with a recovery force of moving upwards.

In this embodiment, the elastic elements 5 are respectively received in the accommodating slots 12 which are formed on the top board 10 of the main body 1. The accommodating slot 12 can be square recess. The first end 52 of the elastic element 5 contacts the top board 10 of the main body 1, or the bottom of the accommodating slot 12; and the second end 53 of the elastic element 5 contacts the inner side of the button 4.

When a user presses the button 4, the elastic element 5 is used to restrain the rebound force from the button 4, so that the button 4 can be exactly clicked without generating a double-click event.

Fourth Embodiment

Figure 10:
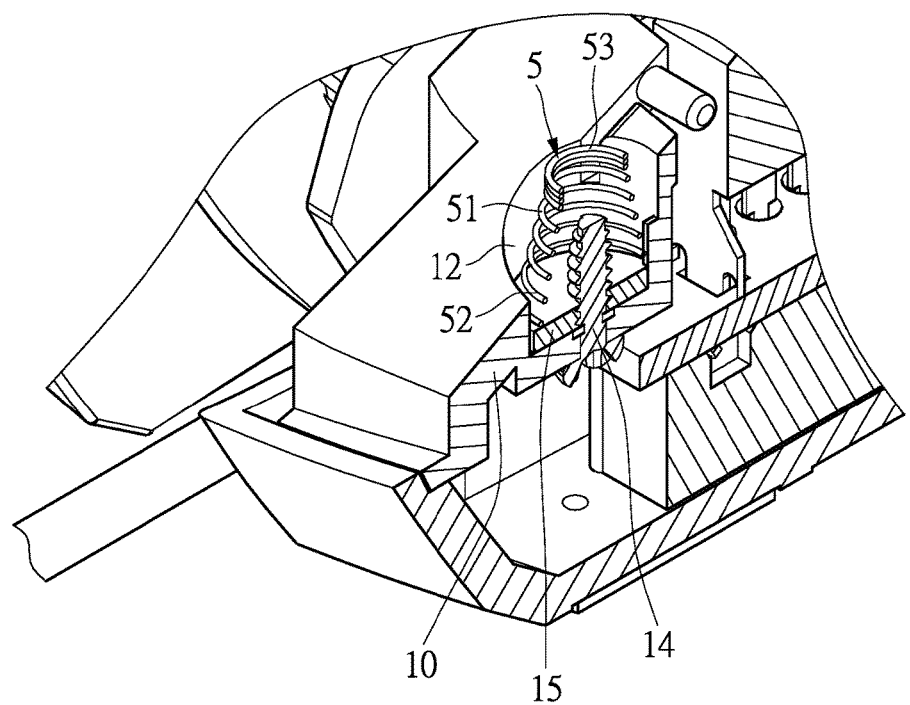
FIG. 10 is a cross-sectional view of the computer mouse according to a fourth embodiment of the present disclosure.

Reference is made to FIG. 10. The main difference between this embodiment and the above-mentioned embodiment is that, the elastic element 5 has an adjusting mechanism. The adjusting mechanism is abutted against the elastic element 5 for adjusting the elastic force of the elastic element 5. The adjusting mechanism has an adjusting screw 14, which is mounted on the top board 10 of the main body 1. The adjusting screw 14 is vertically disposed on the top board 10, and is rotatably mounted on the bottom of the accommodating slot 12. An abutting element 15 is screwed to the adjusting screw 14, and the first end 52 of the elastic element 5 contacts the abutting element 15. When the adjusting screw 14 is rotated, the abutting element 15 can be moved up and down by the threads of the adjusting screw 14, and the elastic force of elastic element 5 can be adjusted, so that the restrain force of the elastic element 5 can be adjusted.

The descriptions illustrated supra set forth simply the preferred embodiments of the present disclosure; however, the characteristics of the present disclosure are by no means restricted thereto. All changes, alterations or modifications conveniently considered by those skilled in the art are deemed to be encompassed within the scope of the present disclosure delineated by the following claims.

What is claimed is:

1. A computer mouse having a button and being capable of restraining rebound force, comprising:
   a main body, having a top board, wherein the top board is arranged on a top of the main body, and a receiving space is formed in the main body;
   a circuit board, assembled in the receiving space;
   a switch module, mounted in the receiving space and electrically connected to the circuit board;
   the button, movably disposed on the top board of the main body in an up-and-down manner, wherein the button has a triggering portion formed on an inner side thereof, the triggering portion is arranged on the switch module, and the button has a free end; and
   an elastic element, disposed between the top board of the main body and the button, the elastic element being close to the free end of the button, the elastic element having a first end and a second end, the first end of the elastic element being abutted against the top board of the main body, and the second end of the elastic element being abutted against the inner side of the button, so as to restrain a rebound force from the button.

2. The computer mouse having the button and being capable of restraining rebound force as claimed in claim 1, wherein the elastic element is a torsion spring, the elastic element has a main part, the main part is a cylindrical spiral, an axial direction of the main part is arranged in a horizontal manner, and the first end and the second end being are formed at two ends of the main part.

3. The computer mouse having the button and being capable of restraining rebound force as claimed in claim 2, wherein the second end of the elastic element is extended along a longitudinal direction of the button.

4. The computer mouse having the button and being capable of restraining rebound force as claimed in claim 1, wherein the elastic element is a spring, the elastic element has a main part, the main part is a spiral structure, an axial direction of the main part is vertical, the first end and the second end are formed at two ends of the main part, and the first end and the second end are ring-shaped.

5. The computer mouse having the button and being capable of restraining rebound force as claimed in claim 4, wherein a diameter of the first end is larger than that of the second end, and the main part is a tapered screw.

6. The computer mouse having the button and being capable of restraining rebound force as claimed in claim 4, wherein an adjusting screw is mounted on the top board of the main body, an abutting element is screwed to the adjusting screw, and the first end of the elastic element is abutted against the abutting element.

7. The computer mouse having the button and being capable of restraining rebound force as claimed in claim 1, wherein the elastic element is a blade spring, the elastic element has a main part, the main part is in a blade shape, and the first end and the second end are formed on the main part.

8. The computer mouse having the button and being capable of restraining rebound force as claimed in claim 1, wherein the elastic element is received in an accommodating slot on the top board of the main body.

9. The computer mouse having the button and being capable of restraining rebound force as claimed in claim 1, further comprising an adjusting mechanism, wherein the adjusting mechanism is abutted against the elastic element to adjust an elastic force of the elastic element.

10. The computer mouse having the button and being capable of restraining rebound force as claimed in claim 9, wherein the adjusting mechanism has an adjusting screw, the adjusting screw is disposed on the top board of the main body, an abutting element is screwed to the adjusting screw, and the first end of the elastic element contacts the abutting element.

* * * * *